United States Patent Office 2,840,505
Patented June 24, 1958

2,840,505

PROCESS OF TREATING ANIMALS FOR METAL POISONING WITH THIO-COMPOUNDS

Rudolf Richard Grunert, Wilmington, Del., Carl S. Marvel, Urbana, Ill., and Isaac Fletcher Walker, Hockessin, Del., assignors to E. I. du Pont de Nemours and Company, Wilmington, Del., a corporation of Delaware No Drawing. Application April 9, 1954
Serial No. 422,268

3 Claims. (Cl. 167—55)

This invention relates to methods for the prophylaxis and treatment of warm blooded animals which are exposed to metal poisoning.

We have discovered that compositions comprising an organic compound of molecular weight not exceeding 500 and of the formula

1                   R—R'—COOR'' wherein R is

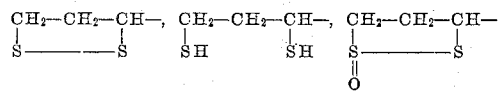

or

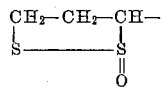

or C-alkyl derivatives thereof in which the alkyl groups contain not more than 4 carbon atoms, R' is a divalent hydrocarbon radical of up to 8 carbon atoms and R'' is —OH or a group hydrolyzable thereto, are antidotes for metal poisoning. When such a composition is administered to warm blooded animals, either orally or parenterally, it counteracts the effect of a metal poison.

By reason of this antidotal action, compositions of our invention can be used for prophylaxis and treatment of warm blooded animals which are or have been exposed either to poisonous compounds of toxic metals such as, for instance, tetraethyl lead, mercuric chloride, sodium arsenite, or to a variety of poisonous compounds of such heavy metals as arsenic, gold, bismuth, tin and the like, or to toxic metals themselves such as for instance lead.

Illustrative of the compounds of Formula 1 there may be named the following:

5-(1,2-dithiolane-3-yl)pentanoic acid (alpha-lipoic acid)
5-(5-methyl-1,2-dithiolane-3-yl)pentanoic acid
Ethyl-1,2-dithiolane-3-yl-formate
4-tert.butyl-5(1,2-dithiolane-3-yl)pentanoamide
2-(1,2-dithiolane-3-yl)acetic acid
3-(1,2-dithiolane-3-yl)propionic acid
6-(1,2-dithiolane-3-yl)hexanoic acid
9-(1,2-dithiolane-3-yl)nonanoic acid
4-methyl-4-ethyl-4-(1,2-dithiolane-3-yl)butyric acid
Oxidized 5-(1,2-dithiolane-3-yl)pentanoic acid (beta-lipoic acid)
6,8-dimercaptooctanoic acid
6,8-dimercaptononanoic acid
Ethyl-2,4-dimercaptobutyrate
4-tert.butyl-6,8-dimercaptooctanoamide
3,5-dimercaptopentanoic acid
4,6-dimercaptohexanoic acid
7,9-dimercaptononanoic acid
10,12-dimercaptododecanoic acid
4-methyl-4-ethyl-5,7-dimercaptoheptanoic acid
Sodium salt of 6,8-dimercaptooctanoic acid It will be understood that the "lipoic acid" compounds of Formula 1 include substituted dithiolanes in which one of the substituents carries a carboxyl group, the corresponding oxidized forms in which one atom of oxygen is attached to the disulfide ring, the corresponding reduced forms in which the dithiolane rings is open to give a dimercaptan. The compositions employed in the processes of the present invention contain one or more of these.

As normally prepared lipoic acids are characterized by the absence of optical activity in that they are the racemic forms, the dl-mixture. It has been found that the free acids and suitable salts thereof such as, for instance, the sodium salt, the potassium salt, or the calcium salt, are usually superior to other acid derivatives in compositions of the invention and for this reason the free acids and salts are preferred.

The organic compounds used in the compositions of this invention may be prepared by the methods of copending applications, Serial No. 325,236, filed December 10, 1952, now Patent No. 2,752,374 by Donald S. Acker and Charles W. Todd, Serial No. 325,237, filed December 10, 1952, now Patent No. 2,752,373 by Donald S. Acker. Oxidation of the 1,2-dithiolanyl ring is readily effected by treating the products of the aforementioned Acker applications with tertiary butyl hydroperoxide. This results in the addition of one atom of oxygen to the disulfide ring.

As already mentioned, compounds of Formula 1 are effective on administration by the oral route, and are also effective when administered parenterally, that is, subcutaneously or intraperitoneally. The dosage of a compound of Formula 1 is critical. The minimum dose is 0.05 milligram per kilogram of animal body weight per day, which represents about a ten-fold increase over normal daily consumption in feed. Generally speaking, the upper dosage limit is about 100 mg./kg./day but may vary to some extent depending on the animal.

In order to better understand the invention, reference should be had to the following illustrative examples:

Example 1

This example illustrates the antidotal efficacy of alpha-lipoic acid,

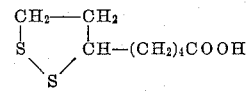

upon animals subjected to mercury poisoning.

Subcutaneously, mice receive a lethal dose of mercuric chloride (20 mg./kg. body weight). The simultaneous administration intraperitoneally of a therapeutic composition containing alpha-lipoic acid, the dosage being 90 mg./kg. body weight, is effective in reducing the mortality rate from 100% to 17%.

Example 2

This example illustrates the antidotal efficacy of alpha-lipoic acid upon animals subjected to arsenic poisoning.

The simultaneous administration of a composition comprising alpha-lipoic acid (81 mg./kg. body weight) intraperitoneally to mice receiving a lethal dose of sodium arsenite (18 mg./kg. body weight) subcutaneously effectively reduces the mortality rate from 100% to zero.

Delayed administration of a similar dose of a composition containing alpha-lipoic acid to mice receiving a similar dose of sodium arsenite (animals near death) results in a recovery of about 73% of the animals.

We claim:

1. A process for the treatment of warm blooded animals exposed to metal poisoning which consists in administering to a living warm blooded animal which has acquired a toxic amount of a metal, a composition comprising an organic compound of molecular weight not more than 500 and of the formula R—R'—COR" wherein R is a monovalent radical of the class consisting of

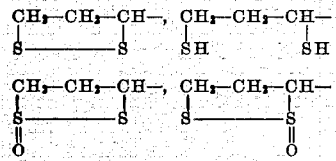

and the C-alkyl derivatives of these radicals wherein the alkyl radical has not more than 4 carbons, R' is a alkylene radical of not more than 8 carbon atoms and R" is selected from the class consisting of hydroxyl and groups hydrolyzable thereto, in the amount of from 0.05 mg./kg. animal body weight/day to about 100 mg./kg. body weight/day.

2. A process for the treatment of warm blooded animals exposed to metal poisoning which consists in administering to a living warm blooded animal which has acquired a toxic amount of a metal, a composition comprising alpha-lipoic acid in the amount of from 0.05 mg./kg. animal body weight/day to about 100 mg./kg. body weight/day.

3. A process for the treatment of warm blooded animals exposed to metal poisoning which consists in administering to a living warm blooded animal which has acquired a toxic amount of a metal, a composition comprising 6,8-dimercaptooctanoic acid in the amount of from 0.05 mg./kg. animal body weight/day to about 100 mg./kg. body weight/day.

References Cited in the file of this patent
UNITED STATES PATENTS

| | | |
|---|---|---|
| 2,660,549 | Friedheim | Nov. 24, 1953 |
| 2,706,158 | Searle | Apr. 12, 1955 |

OTHER REFERENCES

Reed, J. of Biol. Chem., vol. 199, December 1952, pp. 873–888.

Mardones, Acta Physiol. Latinoamer., vol. 3, 1953, pp. 140–143.

Reed, Science, vol. 114, 1951, pp. 93, 94.

Long, Science Progress, vol. 41, October 1953, p. 660.

UNITED STATES PATENT OFFICE
Certificate of Correction

Patent No. 2,840,505                                                        June 24, 1958

Rudolf Richard Grunert et al.

It is hereby certified that error appears in the printed specification of the above numbered patent requiring correction and that the said Letters Patent should read as corrected below.

Column 1, line 22, for "R—R'—COOR'''" read —R—R'—COR''—; column 3, lines 5 to 7, second formula, for Signed and sealed this 2nd day of September 1958.

[SEAL]

Attest:
KARL H. AXLINE,
*Attesting Officer.*

ROBERT G. WATSON,
*Commissioner of Patents.*